United States Patent [19]

Hirashita

[11] 4,235,313
[45] Nov. 25, 1980

[54] SEAL CONSTRUCTION FOR SLIDING PART OF PIN SLIDE TYPE DISC BRAKE

[75] Inventor: Hiroshi Hirashita, Hanyu, Japan
[73] Assignee: Akebono Brake Industry Co. Ltd., Tokyo, Japan
[21] Appl. No.: 973,820
[22] Filed: Dec. 28, 1978
[30] Foreign Application Priority Data Feb. 2, 1978 [JP] Japan ................................... 53-10783

[51] Int. Cl.² ..................... F16D 65/02; F16D 55/224
[52] U.S. Cl. .................................. 188/73.3; 251/353; 277/29
[58] Field of Search ..................... 188/72.4, 73.3, 73.5, 188/352; 308/238; 251/349, 353; 277/29

[56] References Cited

U.S. PATENT DOCUMENTS

| 4,027,750 | 6/1977 | Kawamoto et al. | 308/238 |
| 4,044,866 | 8/1977 | Ishida | 188/352 |
| 4,084,666 | 4/1978 | Karasudani | 188/73.3 |
| 4,123,068 | 10/1978 | Van Gorder | 277/29 |

FOREIGN PATENT DOCUMENTS

| 2637069 | 2/1977 | Fed. Rep. of Germany | 188/73.3 |
| 1408562 | 7/1965 | France | 251/353 |
| 2229290 | 12/1974 | France | 188/73.3 |
| 2312696 | 12/1976 | France | 277/29 |

*Primary Examiner*—Edward R. Kazenske
*Attorney, Agent, or Firm*—Toren, McGeady and Stanger

[57] ABSTRACT

Construction of a seal arrangement for a sliding part of a pin slide type disc brake having a boot attached to the edge of an open end of a cylindrical portion of a caliper to slidably engage the outer circumferential face of a slide pin in an airtight manner. The boot is arranged to have the inner circumference of one end part thereof elastically expandable. The slide pin is provided with a tapered flange part at one end thereof in such a way as to expand and enlarge the end part of the boot. When the slide pin is inserted to a full extent into the cylindrical portion of the caliper, the tapered flange part causes the end of the boot to enlarge to allow an increased portion of air pressure which is increased within the cylindrical portion of the caliper by the insertion of the slide pin to escape to the inside of the boot through an air flow passage provided in the tapered flange part of the slide pin.

6 Claims, 7 Drawing Figures

SEAL CONSTRUCTION FOR SLIDING PART OF PIN SLIDE TYPE DISC BRAKE

BACKGROUND OF THE INVENTION

1. Field of the Invention

This invention relates to construction of a seal arrangement for the sliding part of a pin slide type disc brake.

2. Description of the Prior Art

The conventionally known disc brakes of this type include a disc brake of construction wherein a support is arranged to have a vertical flat face portion disposed in parallel with a rotating face of a disc rotor on one side thereof and a horizontal flat face portion extending from this vertical flat face portion across the edge portion of the disc rotor in the axial direction to the other side of the rotor; a main slide pin which slidably engages a cylindrical portion of a caliper having one end thereof open is supported by the vertical flat face portion of the support in a cantilever like manner; and an auxiliary slide pin is either arranged similarly to this or the auxiliary slide pin is fixed to the caliper while a member which is arranged to slidably engage with the auxiliary slide pin is fixed to the support. The present invention relates to a sealing structure arrangement for the sliding part of a disc brake of the type allowing a slide pin to engage with such a one-end-open cylindrical portion of a caliper assembly.

In a disc brake of this type in general, there is normally provided a boot for the purpose of securing the slidability between the cylindrical portion and the slide pin by shutting off their sliding faces from outside air to prevent muddy water etc. from entering there. The boot is attached to the edge of the open end of the cylindrical portion and has one end part arranged to be airtightly slidable on the outer circumferential surface of the slide pin and the other end firmly fixed to the outer circumferential surface of a part of the slide pin at which the slide pin does not slidably engage the cylindrical portion, the boot thus being arranged to be extendable and contractible in the axial directions. With the boot mounted in this manner, the sliding engagement part of the disc brake is ensured to maintain sufficient slidability between the slide pin and the cylindrical portion thus by a double seal arrangement including a first seal part surrounded by the slide pin and the boot and a second seal part provided inside the cylindrical portion of the caliper.

It has been, however, a problem with such arrangement of the conventional pin slide type brake that the air pressure in the second seal part inside the cylindrical portion increases when the brake is assembled and mounted. As shown in FIGS. 1 and 2 of the accompanying drawings, when the main slide pin 3 which is supported in a cantilever like manner by a support 2 is inserted into the cylindrical portion 6 of a caliper 5 which has one end of the cylindrical portion 6 closed, the volume of the space of the second seal part 13 which is surrounded by the slide pin 3, the cylindrical portion 6 and one end of a boot 10 comes to decrease according as the slide pin 3 is inserted. Then, since this part is shut off from the outside, the air pressure inside this part increases. The increased pressure of air then act as a force to cause a relative movement of the slide pin 3 or the support 2 and the caliper 5 and, under a non-braking condition, causes the caliper 5 to move to a certain extent in the direction of an arrow shown in FIG. 1. This in turn pushes an outer friction pad 9 against a disc rotor 1 to cause dragging there.

This problem can be solved by venting the increased portion of pressure of air to the outside by providing, for example, a check valve at the closed end of the cylindrical portion 6 of the caliper. Such arrangement, however, necessitates the provision of the check valve and an additional process of mounting the check valve and thus results in increase in the number of assembling steps as well as increase in the number of parts. Such arrangement thus causes an increase in cost. The present invention, therefore, is directed to the effective solution of the above stated problem by modifying the shapes of the slide pin and the boot without incurring such increase in cost.

SUMMARY OF THE INVENTION

It is therefore an object of this invention to provide construction of a seal arrangement wherein a boot which is attached to the edge of the open end of the cylindrical portion of a caliper and which slidably engages the outer circumferential face of a slide pin in an airtight manner is arranged to have the inner circumference of one end part thereof elastically expandable; meanwhile, the slide pin is provided with a tapered flange part at one end thereof in such a way as to expand and enlarge the end part of the boot; and, when the slide pin is inserted to a full extent into the cylindrical portion of the caliper, the tapered flange part causes the end of the boot to enlarge to let an increased portion of air pressure within the cylindrical portion of the caliper escape to the inside of the boot through a flow passage provided in the tapered flange part of the slide pin.

It is another object of this invention to provide construction of a seal arrangement which has an excellent sealing effect.

The above and other related objects and features of the invention will be apparent from the following description of embodiments thereof when read in connection with the accompanying drawings.

DETAILED DESCRIPTION OF PREFERRED EMBODIMENTS

Figure 1:
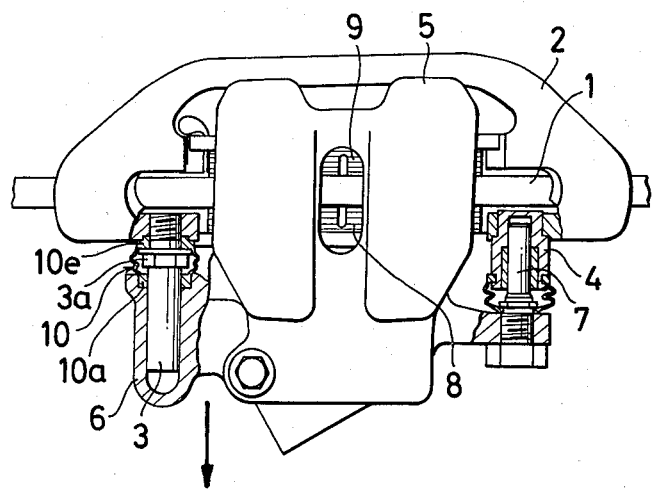
FIG. 1 is a partly sectional plan view showing a conventional pin slide type disc brake.
Figure 5:
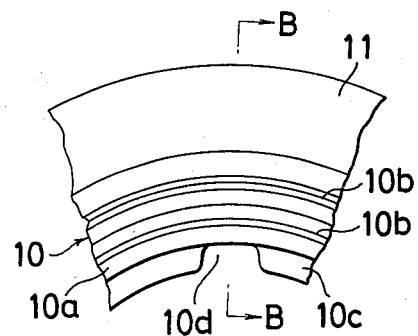
FIG. 5 is an enlarged view showing a part of FIG. 4 taken in the direction of the arrow A.
Figure 6:
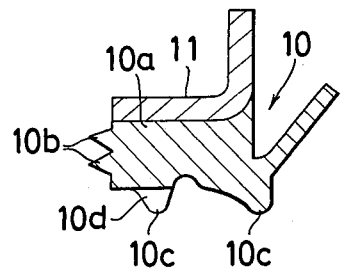
FIG. 6 is a cross section taken on line B—B in FIG. 5.

Referring to FIG. 1, a disc 1 is arranged to rotate together with a wheel. A support 2 is secured to a structural part of a vehicle. A main slide pin 3 is secured to the support 2 in a centilever like manner. A slidable engagement member 4 which is provided for slidable engagement with an auxiliary slide pin is also secured to the support 2. A caliper 5 is arranged to press a pair of friction pads against the disc 1. The caliper 5 is provided with a cylindrical portion 6 for slidable engagement with the main slide pin. The above stated auxiliary slide pin 7 is secured to the caliper 5. Reference numerals 8 and 9 indicate the above stated pair of inner and outer friction pads. A boot 10 is provided between the main slide pin 3 and the cylindrical portion 6 of the caliper. The boot 10 has at one end thereof a seal ring part 10a which is secured to the edge part of an open end of the cylindrical portion of the caliper by a metal ring 11. The inner circumferential face of the seal ring part 10a of the boot 10 is tightly and slidably in contact with the outer circumference of the main slide pin 3. A lip seal part 10b is arranged to elastically engage the cylindrical portion 6 of the caliper 5. Another lip seal part 10c of the boot 10 is arranged to elastically and slidably engage the outer circumference of the main slide pin 3. The lip seal 10c which is located at one end portion of the boot 10 is provided with a concave shaped flow passage 10d as shown in FIGS. 5 and 6. A seal ring 10e which is formed at the other end portion of the boot 10 is arranged to tightly engage a recessed groove which is provided in the outer circumference of the main slide pin 3. The main slide pin 3 is sealed from the outside by a bellows like portion between the two end portions of the boot 10.

The main slide pin 3 is provided with a flange part 3a which is located within the boot 10 with a tapered face 3b formed on the side face portion of the flange part 3a at the free end side of the boot 10 such that the flange part 3a elastically enlarges the lip seal 10c of the boot 10 at its one end portion 10a. The outer surface of the flange part 3a is provided with a concave shaped flow passage 3c which is formed in the tapered face 3b of the flange part 3a.

Figure 2:
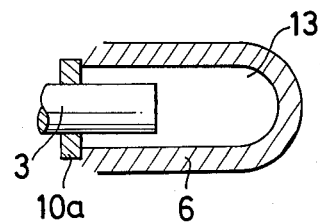
FIG. 2 is an illustration showing a sliding part as in a state of being assembled.

With the above described structural arrangement employed, when the main slide pin 3 is inserted into the cylindrical portion 6 of the caliper in the process of assembling and mounting the disc brake, the volume of space of the second seal part 13 decreases as shown in FIG. 2 and the pressure of air therein increases. Under this condition, the first seal part 12 within the boot 10 and the second seal part 13 are sealed by pressure because the lip seal 10c of the boot 10 is in slidable engagement with the outer circumference of the main slide pin 3.

Figure 3:
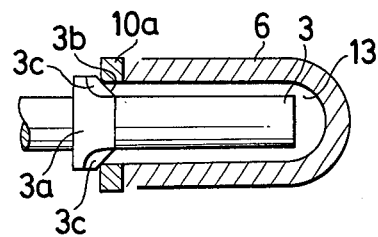
FIG. 3 is an illustration showing a sliding part as an embodiment of the invention as in an air venting state.
Figure 4:
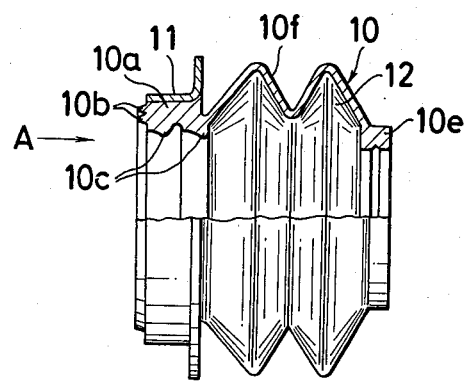
FIG. 4 is a partly sectional view showing a boot.

Then, when the main slide pin 3 is inserted into the cylindrical portion 6 to a maximum extent as shown in FIG. 3, the tapered face 3b of the flange part 3a of the main slide pin 3 causes the lip seal 10c in one end portion 10a of the boot 10 to expand. This in turn permits the above stated first and second seal parts 12 and 13 to communicate with each other through the concave shaped flow passage 3c of the tapered flange face 3b of the main slide pin 3 and the concave shaped flow passage 10d formed in the lip seal part 10c of the boot 10. Then, since the volume of the first seal part 12 is relatively large and the bellows like portion 10f of the boot 10 is arranged to be sufficiently expandable and contractible in the radial and axial directions, an increased portion of the pressure of air which has been increased within the second seal part is allowed to escape into the first seal part.

With the increased portion of the air pressure thus having been allowed to escape, the caliper 5 is brought back into a predetermined position in which the brake is operable; the lip seal part 10c of the seal ring 10a is again brought into tight contact with the outer circumferential face of the main slide pin 3; and again the first and second seal parts 12 and 13 are sealed by pressure.

In this embodiment, the slide pin 3 is secured to the support 2. However, the slide pin may be secured to the caliper 5, instead of the support 2, while the support 2 may be provided with a cylindrical part arranged to permit insertion of the slide pin 3 thereinto.

Figure 7:
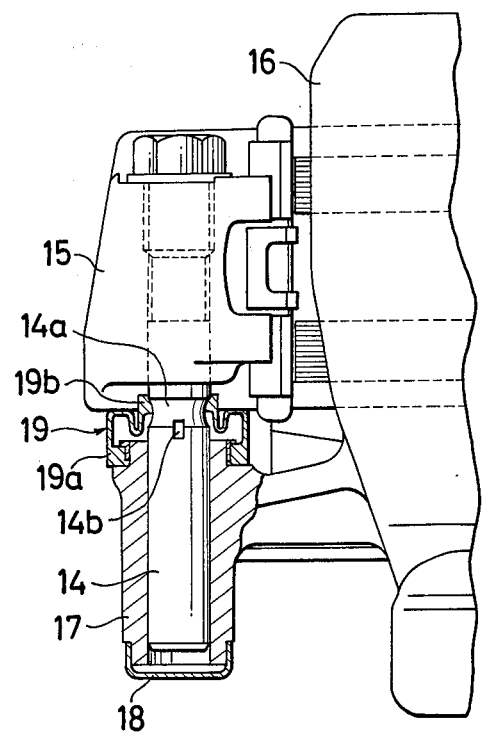
FIG. 7 is an illustration of another embodiment of the invention.

FIG. 7 shows another embodiment of the invention. In this case, a slide pin 14 is screwed to a support 15 and is arranged to be inserted into a cylindrical portion 17 of a caliper 16. One end of the cylindrical portion 17 of the caliper 16 is sealed by a cap 18. One end 19a of a boot 19 which is arranged to seal the sliding part of the slide pin 14 is attached to the cylindrical portion 17. A ring part 19b provided at the other end of the boot 19 is attached to an annular groove 14a of the slide pin 14. At least one long groove 14b is provided at the boundary between the annular groove 14a and the sliding portion of the slide pin 14, spaced in the circumferential direction, and bridging between the sliding portion and the annular groove 14a. When the ring part 19b of the boot 19 goes past the slots 14b during the process of inserting the slide pin 14 into the cylindrical portion 17, the air compressed within the cylindrical portion by the insertion of the slide pin is vented to the atmosphere through the slots 14b.

As described in the foregoing, the air venting arrangement of the pin slide type disc brake of the present invention is capable of preventing the pressure of sealed air within the sliding engagement part from being increased by the use of a slide pin and a boot which have improved shapes. In accordance with the invention, the additional use of a check valve or the like that has been necessary for conventional pin slide type brakes is no longer required. The invention, therefore, brings about a great advantage in terms of reduction in the number of machining and assembling processes. In addition to that, the lip seal parts 10b and 10c provide ample contact face pressure to ensure an excellent sealing effect.

What is claimed is:

1. A seal structure for a sliding part of a pin-slide type disc brake, comprising:
   a disc;
   a pair of friction pads for braking said disc;
   a caliper member for urging said friction pads against said disc;
   a support member;
   a slide pin secured to one of said caliper and support members;
   a cylinder portion provided on the other of said caliper and support members for receiving said pin for sliding movement therein to slidably mount said caliper member on said support member, one end of said cylinder portion being closed, the other end being open and having an edge portion; and
   a seal ring secured to said edge portion of said cylinder portion, said seal ring having an inner circumferential face arranged to sealingly engage the outer circumferential surface of said slide pin, said slide pin having a flange portion thereon extending radially outwardly from said outer circumferential surface, said flange portion having a tapered face with a concave flow passage therein, said face being arranged to radially expand said inner circumferential face of said seal ring when said slide pin is inserted into said cylinder portion to allow air which is compressed in said cylinder portion by said slide pin to communicate with said flow passage thereby being vented to the outside of said cylinder portion.

2. A seal structure according to claim 1, wherein said seal ring comprises a first lip seal portion provided on said inner circumferential face to engage said slide pin.

3. A seal structure according to claim 2, wherein said first lip seal portion has a flow passage therethrough.

4. A seal structure according to claim 3, wherein said seal ring comprises a second lip seal portion arranged to sealingly engage said edge portion of said open end of said cylinder portion.

5. A seal structure for a sliding part of a pin-slide type disc brake, comprising:
   a disc;
   a pair of friction pads for braking said disc;
   a caliper member for urging said friction pads against said disc;
   a support member;
   a slide pin secured to one of said caliper and support members, said pin having a sliding portion and an annular groove in its outer circumferential surface which bounds said sliding portion, said pin also having a groove extending in its outer surface in the long direction thereof between said sliding portion and said annular groove;
   a cylinder portion provided on the other of said caliper and support members for receiving said sliding portion for sliding movement therein to slidably mount said caliper member on said support member, one end of said cylinder portion being closed; and
   a seal boot having one end thereof arranged to sealingly engage said annular groove in said slide pin, the other end of said boot being fixed to said cylinder portion, wherein said long groove vents air compressed in said cylinder portion when said slide pin is inserted in said cylinder portion and said one end of said boot passes over said long groove.

6. Construction of a sliding part seal arrangement for a pin slide type disc brake according to claim 5, wherein a plurality of said long groove are spaced in the circumferential direction.

* * * * *